Nov. 6, 1945.   F. LE B. LORD   2,388,270
LOCK NUT UNIT
Filed Oct. 3, 1944
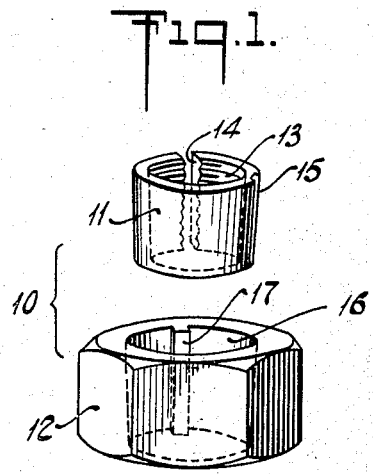
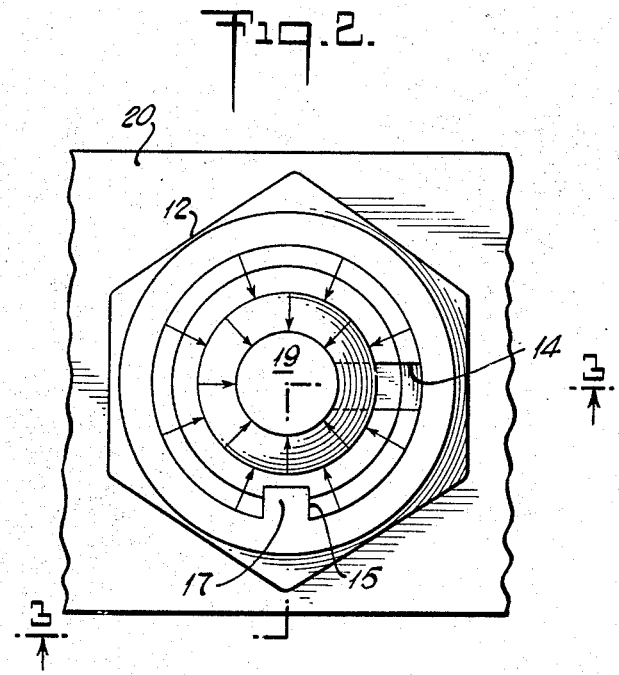
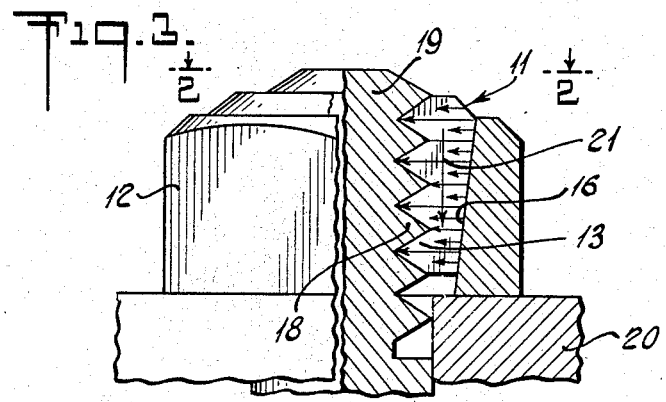
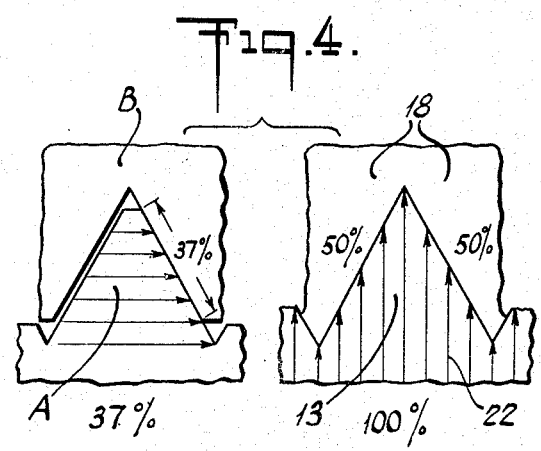
INVENTOR
F. LE BARRON LORD.
BY
ATTORNEY Patented Nov. 6, 1945

2,388,270

UNITED STATES PATENT OFFICE 2,388,270

LOCK NUT UNIT

Francis Le Barron Lord, Bloomfield, N. J., assignor to Titelox Manufacturing Company, Montclair, N. J., a corporation of New Jersey Application October 3, 1944, Serial No. 556,980

4 Claims. (Cl. 151—19)

Heretofore numerous expedients have been proposed to serve as lock nut units. The means heretofore proposed to preclude accidental disengagement of threaded members usually depended upon the use of extraneous members, which were temporary expedients, rendered ineffective in time, due to fatigue, exposure to the elements, and other causes. The lock nut unit of my invention is not subject to the objections noted.

A further object of the invention is to provide a lock nut unit of such structure as to enable the attainment of a predetermined wrapping effect on assembly of the parts.

A further object of this invention is to provide a lock nut unit which is effective and positive in operation and, at the same time, permits of the disengagement of the parts when desired in a simple manner, without injury to the parts.

An embodiment of a structure employing the invention is shown in the accompanying drawing and described in detail in the ensuing specification, by way of example. The invention is not limited thereto but includes all other forms which would come within the scope of the appended claims.

In the drawing,

Fig. 1 is a disassembled perspective view of the lock nut unit of my invention, comprising an internal member and an external member, Fig. 2 is a top plan view thereof taken on line 2—2 of Fig. 3, showing the lock nut unit in assembled relation, Fig. 3 is a vertical, partly section, partly fragmentary, view taken on line 3—3 of Fig. 2 in the direction of the arrows, and Fig. 4 graphically illustrates the comparative effectiveness of the lock nut unit of my invention relative to standard thread-engaging members.

In the embodiment of the invention shown in Fig. 1 of the drawing, the lock nut unit 10 comprises an internal member 11 adapted to be received within an external member 12. The internal member 11 is internally apertured and threaded as at 13, is axially slitted as at 14, and is externally tapered and provided with an external keyway 15 for a purpose presently explained.

The external member 12 has an internal tapered aperture 16 for the reception of the internal member 11 and has a key 17 extending or protruding into said aperture 16 for reception in the keyway 15 of internal member 11, on assembly of the parts.

In operation, when it is desired to engage the threaded portion 18 of a member 19 for the purpose of holding an object 20 to another object, or for an analogous purpose, the lock nut unit of my invention may be threaded to the threaded portion 18 of the member 19 as follows. The internal member 11 is inserted into the aperture 16 of the external member 12 with the key 17 received within the keyway 15, the relative dimensions of the parts being such that the internal member can initially be partly inserted into the external member as described. The external member 12 (with the internal member 11 inserted therein as described above) is then juxtaposed on the member 19 and rotated so that the threaded portion 18 of said member 19 will be threadedly engaged by the threaded aperture 13 of the internal member 11. Continued rotation of the external member 12 will cause further threading of the parts described, so that the internal member 11 will be progressively further advanced into the external member 12 against the resistance offered by virtue of the fact that the internal member 11 is advanced toward the tapered end of the aperture 16 of smaller diameter. The internal member 11 advances into the external member 12 in the threading operation in the general direction indicated by the arrow 21 (Fig. 3) in the longitudinal axis of the lock nut unit 10. Internal member 11 is simultaneously moved laterally at right angles to the axis plane indicated by arrow 21, and into positive contact with the threads 18. It is thus possible to attain a high degree of efficiency in the transmission of the energy exerted in the rotating of the member 12 to the interengaging of threads 13 and 18. This is attained by virtue of the fact that the force exerted on the threaded portion 13 of the internal member 11 will be the product of the movement of the member 11 on the general longitudinal axis thereof indicated by the arrow 21 multiplied by its movement at a plane at right angles thereto, generally designated by the arrows 22 and into contact with threads 18.

The keyway 15 is located at a predetermined circumferential point relative to the slit 14 of the internal member 11 so that one may obtain a predetermined wrapping effect to resist disengagement of the parts generally corresponding to the effect of wrapping a loop about a rod wherein more than half of the loop is wrapped on the rod, when so desired. If the keyway 15 is located diametrically opposite the slit 14 (which would be at a peripheral point substantially 180° from the slit 14) then the keying of member 11 in the external member 12 would be substantially at a neutral point so that no wrapping effect would be attained. By selecting a circumferential point at which the keyway 15 is located relative to the slit 14 other than 180°, one may predetermine the wrapping effect to be attained and the tendency of the parts to resist disengagement and to favor a tightening, or loosening tendency after assembly.

The slit 14 permits the internal member 11 to be tightly compressed on the threaded portion 18 of the member with which the lock nut unit engages so that 100% of the surfaces of the engaging threads will be bound together and in contact. This feature is graphically illustrated in Fig. 4, indicating that both oppositely inclined planar surfaces of the threads 13 and 18 have this binding, contacting effect, resulting in a 100% pressure engagement of the threads, whereas in the engagement of the threaded member A, which may be the conventional nut, with a second threaded member B which may be the conventional bolt, only part (or approximately 37%) of one series of parallel planar surfaces of the threads engage with part of the adjacent parallel series of planar surfaces of the threads. In recognition of this fact it has been customary to flatten the crests of the threads of members A and B as shown in Fig. 4 so that the effectively engaging surfaces of the conventional threaded bolt and nut is only 37% as against the 100% thread engagement in the use of the lock nut unit of my invention.

On assembly of the parts as shown in Fig. 3, the threads 13 and 18 will be fully engaged as described above so as to provide an effective seal and the parts will automatically tend to resist displacement due to vibration or other extraneous forces. To disengage the parts, the external member 12 is rotated in a reverse direction to that used in the assembly of the parts. After rotating the external member 12 for part of a revolution, the external member may be tapped at the outer face thereof in the general direction of the arrow 21; this action will shift the internal member in the aperture 16, breaking the taper seal so that further rotation of the external member 12 to disengage the parts may be had with comparative ease.

If desired, the internal member 11 may be provided with a plurality of keyways 15 so that the user may select one to receive the key 17 for the purpose above described, within the purview of this invention. The means for axially keying the internal member 11 in the external member 12 may comprise a means equivalent to the key 17 and keyway 15, within the purview of this invention.

The parts may be made of any desirable or suitable material and the dimensions thereof may be varied to suit the requirements of the use to which the same are to be put, the representation in the drawing being solely for the sake of illustrating one embodiment of the invention.

*Definitions.*—The term "predetermined wrapping effect" as used in the specification and claims hereof shall be deemed to mean the location of the slit relative to the keying means so that on engagement or disengagement of the members a wrapping effect is attained where the slit is located other than 180° from the keying means and where the slit is located at 180° from the keying means the wrapping effect is nil—in short, the term shall be deemed to mean predetermining whether and if so the degree of wrapping effect to be attained, by the relative location of the parts referred to.

The term "unitary" shall be deemed to mean integral with or moving as a unit with or fixed to in a manner which will preclude independent movement such as would occur where the parts fit loosely; in short, the term shall be deemed to mean having the nature of a unit rather than a loose part. The term "positive force imparting surfaces" shall be deemed to mean having surfaces generally facing the direction of rotation of the members so as to positively impart the force applied to the key through the direction of the rotation of the parts rather than at a plane angular thereto. The latter occurrence would favor seizure or binding rather than the true keying action permitting of the rotation of the parts and the relative reciprocation thereof as set forth above.

Having thus described my invention, what I claim as new and desire to secure by Letters Patent, is:

1. A lock nut unit comprising an internal member provided with an axial slit, said member being externally tapered and internally threaded for engaging a threaded member, and being provided with at least one external keyway, an external member provided with an internal axially tapered aperture to receive said internal member, and a key extending from said external member adapted to be received in said keyway to key the internal member in the external member for axial reciprocation therein, said key being provided with spaced flat surfaces which face the directions of rotation of the external member said internal member being adapted to be contracted to close the slit thereof to enable the same to be received in the aperture of said external member, said keyway being so disposed relative to the slit as to provide a predetermined wrapping effect when the parts are assembled and engage a threaded member.

2. A lock nut unit comprising an internal member provided with an axial slit, said member being externally tapered, an external member provided with an internal axially tapered aperture to receive said internal member keying means of generally rectangular cross-section unitary with said external member, and means complementary to said keying means in said internal member to be engaged by said keying means.

3. A lock nut unit comprising an internal member provided with an axial slit, said member being externally tapered, an external member provided with an internal aperture to receive said internal member, and a key and keyway on said members for relative axial reciprocation thereof, said key and keyway being of generally rectangular cross-section, the key being unitary with the member provided therewith said keyway being so disposed relative to the slit as to provide a predetermined wrapping effect when the parts are assembled and engage a member.

4. A lock nut unit comprising an internal member provided with an axial slit, said member being externally tapered, an external member provided with an internal aperture to receive said internal member, and a key and keyway on said members for relative axial reciprocation thereof, said key being unitary with the member provided therewith and being provided with positive force imparting surfaces.

F. LE BARRON LORD.